United States Patent
Figiel et al.

(12) 
(10) Patent No.: US 6,838,187 B2
(45) Date of Patent: Jan. 4, 2005

(54) WATER BASED ADHESIVE COMPOSITION WITH RELEASE PROPERTIES

(75) Inventors: Edmund W. Figiel, Ringoes, NJ (US); Melissa Allen, Hillsborough, NJ (US); Peter D. Pierce, Washington Crossing, PA (US); Kristina L. Thompson, North Brunswick, NJ (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 0 days.

(21) Appl. No.: 10/143,332

(22) Filed: May 10, 2002

(65) Prior Publication Data

US 2003/0211351 A1 Nov. 13, 2003

(51) Int. Cl.⁷ .............................................. B32B 23/04
(52) U.S. Cl. ........................ 428/532; 428/533; 428/534; 428/536; 428/537.5; 428/343; 428/352; 428/354
(58) Field of Search .................................. 428/532, 533, 428/534, 536, 537.5, 343, 352, 354

(56) References Cited

U.S. PATENT DOCUMENTS

| | | | |
|---|---|---|---|
| 4,145,464 A | | 3/1979 | McConnell et al. |
| 4,773,903 A | | 9/1988 | Weisman et al. |
| 4,865,596 A | | 9/1989 | Weisman et al. |
| 4,876,023 A | | 10/1989 | Dickenson et al. |
| 5,210,982 A | | 5/1993 | Kormanek et al. |
| 5,230,933 A | * | 7/1993 | Apfeld et al. .............. 428/34.8 |
| 5,631,052 A | | 5/1997 | Andersen et al. |
| 5,654,048 A | | 8/1997 | Andersen et al. |
| 5,800,755 A | | 9/1998 | Withenshaw et al. |
| 6,280,514 B1 | | 8/2001 | Lydzinski et al. |
| 6,280,515 B1 | * | 8/2001 | Lydzinski et al. .......... 106/122 |
| 6,387,475 B1 | | 5/2002 | Figiel et al. |

FOREIGN PATENT DOCUMENTS

| | | |
|---|---|---|
| JP | 03162471 | 7/1991 |
| JP | 2001262203 | 9/2001 |
| WO | WO 02/00804 | 1/2002 |

* cited by examiner

Primary Examiner—Leszek Kiliman
(74) Attorney, Agent, or Firm—Cynthia L. Foulke

(57) ABSTRACT

An aqueous adhesive composition with good release properties. A preferred embodiment comprises sodium lauryl sulfate and a modified tapioca dextrin.

17 Claims, No Drawings

WATER BASED ADHESIVE COMPOSITION WITH RELEASE PROPERTIES

FIELD OF THE INVENTION

The invention relates to water-based adhesive compositions having good release properties as well as adhesion, stiffness and strength properties making it useful in paper applications such as tissue and towels requiring release properties and coreless paper rolls.

BACKGROUND OF THE INVENTION

Starches and dextrins have long been used as adhesive materials in various applications such as the fabrication of corrugated boards, paper bags, paper boxes, laminated paperboard, spiral-wound tubes, gummed labels, gummed tapes and other gumming applications. Disclosure of these and other applications may be found in "Starch Chemistry and Technology", 2nd Edition, edited by R. Whistler et al., 1984, pp. 593–610 and "Starch and Its Modifications", chapter 22, by M. W. Rutenberg, pp. 22–63 and 22–64 in "Handbook of Water-Soluble Gums and Resins", edited by Robert L. Davidson, 1980.

Typical adhesive categories include liquid adhesives, pastes, cold-water soluble adhesives and water resistant adhesives and provide properties such as tack, adhesion, solution viscosity and stability. While starch adhesives have been used in such applications, they generally do not provide release properties. Typically, separate release agents and coatings are used and they comprise materials such as silicones and waxes.

Use of conventional technology raises recycling concerns or environmental issues, e.g., land fill issues associated with spent cardboard tubes. A need exists for an adhesive that can be used in the construction of "coreless" rolls of tissue and towels wherein the adhesive can be integrated into the web of the substrate to provide a core, and allow for 100% of the finished product to be used. Because there is no waste, there will be no recycling or environmental issues. The current invention addresses this need.

SUMMARY OF THE INVENTION

The invention provides a fugitive adhesive composition. The adhesive of the invention has good release properties and is particularly useful in the manufacture of rolls of "coreless" rolls of bath tissue/towel.

One aspect of the invention is directed to a composition comprising water, a surfactant and an amount of a polysaccharide sufficient to provide fugitive adhesive properties to the composition. Preferred surfactants for use in the practice of the invention are nonionic or ionic surfactants. Polysaccharides preferred for use in the practice of the invention are starches, modified tapioca dextrin being particularly preferred.

Another aspect of the invention is directed to articles of manufacture comprising the adhesive of the invention. Article of manufacture include but are not limited to rolled paper products, folding cartons, printed matter including magazine inserts and coupons, and wall paper.

Still another aspect of the invention is directed to a process for bonding a substrate to a similar or dissimilar substrate comprising applying to at least a first substrate a fugitive adhesive composition, bringing a second substrate in contact with the composition applied to the first substrate, whereby the first and second substrates are bonded together, said adhesive comprising water, a surfactant and a polysaccharide.

DETAILED DESCRIPTION OF THE INVENTION

The invention relates to water-based adhesive compositions having good release properties as well as adhesion, stiffness and strength properties making it useful in paper applications such as tissue and towels requiring release properties and coreless paper rolls. More particularly, this invention involves an aqueous adhesive composition comprising water, a surfactant and an amount of a polysaccharide effective to confer fugitive adhesive properties to the composition.

The performance properties of the adhesive (provides good release properties in addition to adhesion, stiffness and strength) makes this composition particularly suitable in paper applications requiring release and strength properties such as needed in tissue and towel applications, i.e., for use in coreless paper rolls, where stiffness and strength as well as release properties are important characteristics. Moreover, the adhesive is biodegradable and environmentally friendly which makes it desirable for use in paper applications where repulpability and recyclability are desired. Other applications for this adhesive-release composition that are encompassed by the invention include folding cartons, coupons or labels, envelopes and cigarette packaging.

By fugitive adhesive is meant an adhesive capable of temporarily bonding two substrates together. Upon application of a deliberate debonding activity, such as manually pulling the two substrates apart, the bond is destroyed thereby releasing one substrates from the other without destructive fiber tear.

By non-destructive fiber tear is meant that there is no fiber tear or that any resulting fiber tear is insufficient to cause defects in the substrate.

The adhesive of the invention comprises water, surfactant and a polysaccharide and may, if desired, also comprise a preservative, a defoaming agent and the like.

Examples of polysaccharides which may be used in the practice of the invention include starch, cellulose and gums such as galactomannans. Particularly useful are the starches and dextrins including, native, converted or derivatized. By "native" starch is meant starch as it comes from the plant source and includes natural starches as well genetically altered and hybrid starches.

Starches that can be used in the practice of the invention include those derived from any plant source including rye, corn, potato, wheat, rice, sago, tapioca, waxy maize, sorghum and high amylose starch such as high amylose corn, i.e., starch having at least 45% amylose content by weight. Starch flours may also be used. Included are the conversion products derived from any of these plant sources, such as, for example, dextrins prepared by hydrolytic action of acid and/or heat; fluidity or thin boiling starches prepared by enzyme conversion or mild acid hydrolysis; oxidized starches prepared by treatment with oxidants such as sodium hypochlorite; and derivatized or modified starches such as cationic, anionic, amphoteric, non-ionic, crosslinked and hydroxypropyl starches. Other useful polysaccharides are cellulose materials such as carboxymethylcellulose, hydroxypropyl cellulose and hydroxypropyl methylcellulose, and gums such as guar, xanthan, pectin and carrageenan.

The polysaccharides may be degraded, modified, or derivatized, such as by etherification, esterification, acid hydrolysis, dextrinization, crosslinking, pregelatinization or enzyme treatment (e.g., with alpha-amylase, beta-amylase, pullulanase, isoamylase, or glucoamylase). Starches for use in accordance with the invention may be degraded by any means known in the art. Means of obtaining a degraded starch include the action of acids, enzymes, dry heat reactions (i.e. dextrins), oxidizing agents and catalysts capable of reducing molecular weight in a controlled and reproducible manner. The starch may also be modified to contain a functional groups such as cationic, anionic, non-ionic or hydrophobic substituent. Polysaccharides modified with an alkyl succinic anhydride are known and can be synthesized by means known in the art. Modified polysaccharides include, but are not limited to, octenyl succinic anhydride (OSA) and dodecenyl succinic anhydride (DDSA) modified starches or dextrins. Methods for modifying starch are well known in the art. See, e.g., U.S. Pat. No. 2,661,349, U.S. Pat. No. 5,672,699, "Starch: Chemistry and Technology", second edition, edited by R. L. Whistler et al., 1988, pp. 341–343 and "Modified Starches: Properties and Uses", edited by O. Wurzburg, 1986, Chapter 9, pp. 131–147.

In a preferred embodiment, a modified tapioca dextrin is used. Modified tapioca dextrins that can be used in the practice of the invention are commercially available and include Crystal Tex™ 626 available from National Starch and Chemical Company, Bridgewater, N.J.

The modified polysaccharide will typically be present in amounts of from about 1% to about 70%, more typically from about 10% to about 60%.

Surfactants for use in the practice of the invention include anionic, cationic, amphoteric, or nonionic surfactants, or mixtures thereof. Preferred for use are nonionic and/or anionic surfactants. Suitable anionic surfactants include, alkyl sulfonates, alkylaryl sulfonates, alkyl sulfates, alkyl and alkylaryl disulfonates, sulfonated fatty acids, sulfates and phosphates of alkylphenols, esters of sulfosuccinic acid and mixtures thereof. Suitable non-ionic surfactants include alkylphenols, higher fatty acids, higher fatty acid amines, primary or secondary higher alkyl amines, and mixtures thereof.

Surfactants that can be used in the practice of the invention are commercially available. Particularly preferred for use is sodium lauryl sulfate which is available e.g., from Witco Corp. under the name "Duponol Me Dry" and from Cognis Corp. under the name "Standapol WAQ-LC."

The surfactant will typically be present in amounts of from about 0.001% to about 70%, more typically from about 0.01% to about 25%.

It will be appreciated that separate starch and surfactant components are not required and that a surfactant modified starch may be used in the practice of the invention. A modified succinic anhydride (OSA) starch having grafted thereon a surfactant are contemplated for use in the practice of the invention.

In addition to the surfactant and polysaccharide components, minor amounts of conventional additives may optionally be added to the adhesive composition of this invention. Such additives and ingredients include colorants, preservatives, humectants, fillers, pigments, viscosity modifiers, flow modifiers, etc. Typically, these additives will comprise from about 0 to 20% and more particularly 0 to 5% by weight based on the total solids weight of the composition.

The adhesive composition of this invention has a unique combination of properties including adhesion, stiffness and strength in addition to release properties. These properties make the composition suitable for use in a variety of applications and especially paper applications where strength and release are important desired characteristics, for example in tissue and towels.

The adhesive is especially suitable for coreless paper rolls where its strength attributes allow for the elimination of the tubes that typically are used to hold and support the paper. The formation of coreless paper rolls or coreless tubes using the adhesive composition of the invention involves forming rolls of paper or tissue/towels without the use of a foreign support to hold the main body of the rolled paper substrate. By applying an effective amount of the adhesive composition to provide sufficient stiffness, the rolled paper will maintain its shape and integrity. While the adhesive composition can be applied to the entire surface of the paper substrate, in order to be effective and also economically attractive less than about 5% of the beginning or first part of the substrate surface may be covered, i.e. from about 0.1 to 5% of the substrate surface. More particularly, less than about 1% of the substrate surface will be covered with adhesive composition. The amount of adhesive composition that is applied to the paper substrate will also be an effective amount of up to about 1 g/m of paper and more particularly from about 0.1 to 1 g/m of paper. The adhesive composition can be applied using any known methods for applying such materials including spraying, roll coating (film transfer), extrusion, etc.

It will be appreciated that the adhesive of the invention may be used in a wide variety of applications. Moreover, since the composition mainly comprises starch, a biodegradable and environmentally friendly material, it is suitable in paper and other applications where repulpability and recyclability are desired.

Other applications for this adhesive include folding cartons, coupons or labels, envelopes and cigarette packaging. For example, the adhesive can advantageously be used to temporarily bond cartons, such as the side seam of cigarette cartons, together for shipment to the state of sale where the carton may, if desired, be permanently bonded for sale. The adhesive may be used in place of a pressures sensitive adhesive to bind pages of a note pad together, a fugitive bond holding one page to the next page. The adhesive also may advantageously be coated onto paper, ribbon, thread, bandages or other item that is conventionally manufactured, stored and use in a rolled up condition. The adhesive of the invention will thereby function to keep bandages wound up before use, will keep sheets of paper towel together prior to use such that "flagging" of the towels will be prevented when e.g., the towels are positioned upright when placed in a vertical-type dispenser. The adhesive can also be used on wall paper and can advantageously be used to adhere inserts/mailers in magazines. It will be appreciated that the adhesive has many other uses, such as "tail tie" applications among others, as would be recognized by those of skill in the art.

The following examples will further illustrate the invention. In these examples, all parts are given by weight and all temperatures in degrees Celsius unless otherwise noted.

EXAMPLE 1

A mixture containing 54.50% water, 45.00% of a modified tapioca dextrin available from National Starch and Chemical under the name Crystal Tex™ 626 and 0.026% of a defoamer was cooked to 200° F. and held at this temperature for 30 minutes, after which the temperature was lowered to 100° F. To this was added 0.50% sodium lauryl sulfate, 0.15% of a preservative and 0.025% of a defoamer and mixed thoroughly for 30 minutes. The composition was then filtered through a 200 mesh screen.

EXAMPLE 2

Tissue samples using the adhesive formulation of Example 1 were prepared as follows: A single ply tissue (basis weight 9.3 lbs./3000 ft) measuring 11×30 cm. was weighed and recorded. A glass plate measuring 8×15 inches was used as a drawdown board. The adhesive composition from Example 1 was applied to the glass plate with a six inch Bird applicator and provided a film thickness of 0.5 mil. A 1 inch diameter chrome polished pipe, 6 inches in length, was used as a support for the paper. The tissue was rolled onto the pipe keeping the edges in line. The tissue was applied to the adhesive by unfurling the roll using the pipe as a roller (one pass only with slight pressure). The sample tissue was rolled back onto the pipe keeping the edges in line and lifting the tissue from the glass. The tissue sample was then placed in a drying oven at 120° F. for five minutes. The paper roll was then slid away from the pipe. This paper tube core was tested for stiffness (crush test) and release properties (fiber tear) as follows. The sample paper tube was tested for stiffness by placing a 25 g weight onto the side of the tube and observing any collapse (crush test). Release properties were determined by suspending the chrome pipe by the ends and completely unwinding the paper core at moderate speed (about 2 seconds). The paper tissue was then examined for any fiber tear or high resistance to unwinding. Results show that the adhesive provides the required stiffness (crush resistance). No destructive fiber tear was observed.

What is claimed is:

1. A composition comprising a surfactant and an amount of a polysaccharide effective to provide fugitive adhesive properties.
2. The composition of claim 1 wherein the polysaccharide is a starch.
3. The composition of claim 2 wherein the starch is a modified dextrin.
4. The composition of claim 3 wherein the modified dextrin is a modified tapioca dextrin.
5. The composition of claim 4 wherein the surfactant is sodium lauryl sulfate.
6. An article of manufacture comprising the composition of claim 1.
7. The article of claim 6 wherein the polysaccharide in said composition comprises a starch.
8. The article of claim 7 wherein the starch is a modified tapioca dextrin.
9. The article of claim 8 wherein the surfactant in said composition comprises sodium lauryl sulfate.
10. The article of claim 6 which is a rolled paper product.
11. The article of claim 10 which is a coreless rolled paper product.
12. The article of claim 10 wherein the polysaccharide in said composition comprises a modified tapioca dextrin and the surfactant in said composition comprises sodium lauryl sulfate.
13. A process for temporarily bonding a first substrate to a similar or dissimilar second substrate comprising applying the composition of claim 1 to at least a first substrate, bringing a second substrate in contact with the composition applied to the first substrate, whereby the first and second substrates are fugitively bonded together.
14. The process of claim 13 wherein the composition comprises a starch.
15. The process of claim 14 wherein the starch is a modified tapioca dextrin.
16. A coreless rolled paper product wherein an effective amount of the composition of claim 1 is applied to a first portion of the paper and the paper is then would to form a self supporting roll.
17. The coreless paper product of claim 16 wherein the composition comprises a modified tapioca dextrin and sodium lauryl sulfate.

* * * * *